United States Patent

Hoshino et al.

[11] Patent Number: 6,023,347
[45] Date of Patent: *Feb. 8, 2000

[54] SCANNER FOR SCANNING PHOTOGRAPHIC IMAGES

[75] Inventors: Yasushi Hoshino; Kohichi Yamaguchi; Satoshi Harada; Toshiki Fujisawa; Kosei Miyauchi, all of Hachioji; Seiji Tanaka, Suwa, all of Japan

[73] Assignees: Konica Corporation; Seiko Epson Corp., both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/839,814

[22] Filed: Apr. 18, 1997

[30] Foreign Application Priority Data

Apr. 26, 1996 [JP] Japan ................................. 8-107459

[51] Int. Cl.[7] ................................................. H04N 1/04
[52] U.S. Cl. ............................................. 358/487; 358/506
[58] Field of Search ................................... 358/487, 506, 358/443, 452, 468, 471, 479, 513, 523, 527, 530; 395/139, 133, 135, 451, 462, 479, 527

[56] References Cited

U.S. PATENT DOCUMENTS

| 5,153,733 | 10/1992 | Fetterman et al. | 358/214 |
| 5,430,832 | 7/1995 | Imaizumi et al. | 395/134 |
| 5,448,372 | 9/1995 | Axman et al. | 358/342 |
| 5,461,492 | 10/1995 | Jones | 358/487 |
| 5,534,973 | 7/1996 | Harada | 355/202 |
| 5,757,420 | 5/1998 | Hoshino et al. | 348/96 |

FOREIGN PATENT DOCUMENTS 410232422A 9/1998 Japan ................................. G03B 7/24

*Primary Examiner*—Jerome Grant, II
*Attorney, Agent, or Firm*—Finnegan, Henderson, Farabow, Garrett & Dunner, L.L.P.

[57] ABSTRACT

A device for displaying photographic images by reading image data recorded on a film and displaying them on a display means, wherein the kind of the film is discriminated, at least either one of the number of frames displayed on a screen of the display means or the reading resolution of the image reader means is variably determined depending upon the kind of the film that is discriminated, and the images are displayed on the screen of the display means depending upon the determination by the determination means. The images of frames of a number determined depending upon the kind of the film are efficiently displayed on the screen of the display means and/or the images are displayed maintaining a proper resolution depending upon the kind of the film by varying the reading resolution of the image reader means.

6 Claims, 13 Drawing Sheets

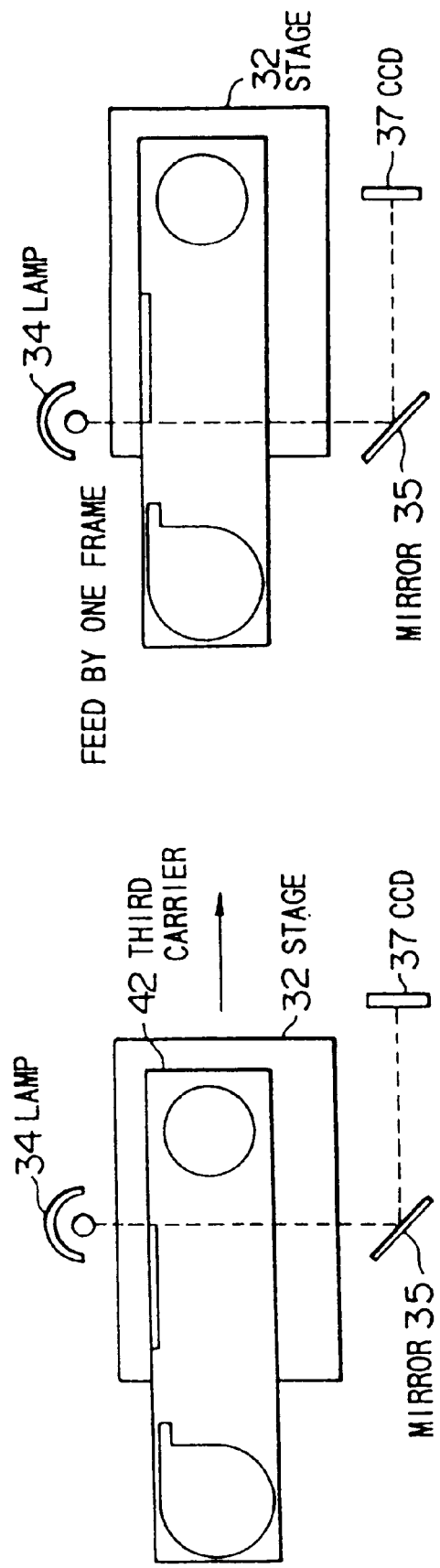

SCANNER FOR SCANNING PHOTOGRAPHIC IMAGES

BACKGROUND OF THE INVENTION

1. Field of the Invention

The present invention relates to a device for displaying photographic images for reading and displaying image data recorded on a film.

2. Related Art of the Invention

In recent years, a photographic image processing system has been employed in which an image photographed by using a camera is converted into electronic digital image data. In many systems of this type, a film photographed by using a camera and is developed, is read by using a scanner and is converted into digital image data and then stored.

The developed films also assume various forms. For instance, the most generally used film J135 is returned back from the laboratory in a form in which it is cut after every six frames (hereinafter referred to as a piece film) and a reversal film J135 assumes a form in which it is mounted for every frame (hereinafter referred to as a mount film). According to a new photographic system announced in recent years, furthermore, the film that is developed is returned back from the laboratory in a form in which the film is all being taken up in the cartridge (hereinafter referred to as a long wound film IX-240), indicating a diversity in the kinds of the films. Therefore, even in the device for displaying photographic images, which is one of the above-mentioned photographic image processing systems, it has been urged to provide a device which meets the user's demands such as easy use, easy-to-see screen, etc. yet coping with diversifying photographic films.

SUMMARY OF THE INVENTION

The present invention was accomplished in view of the above-mentioned assignments, and its object is to provide a device for displaying photographic images which, at the time of reading the image data recorded on a film and displaying them on a display means, changes the display state depending upon the kind of the film, to thereby achieve the display which facilitates the image processing.

To accomplish the above-mentioned object, the device for displaying photographic images according to the present invention comprises:

an image reader means for reading image data recorded on a film;

a discrimination means for discriminating the kind of the film;

a determination means for variably determining at least either one of the number of frames displayed on a screen of a display means or the reading resolution of the image reader means depending upon the kind of the film that is discriminated; and a display control means for displaying the image on the screen of said display means depending upon the determination by said determination means.

Then, at the time of reading the image data and displaying them on the display means irrespective of the kind of the film, the images of the number of frames determined depending upon the kind of the film are displayed on one screen of the display means, so that many images can be efficiently displayed on the screen, and/or the images can be displayed maintaining a proper resolution depending upon the kind of the film by changing the reading resolution of the image reader means.

Here, the discrimination means may discriminate the kind of the film based on a carrier for holding the film, which differs depending upon the kind of the film.

Then, the kind of the film can be easily discriminated based on the feature of the carrier that holds the film.

Here, the determination means may determine the number of frames displayed on one screen in a manner of six frames when the kind of the discriminated film is a piece film of the film J135, four frames when the kind of the discriminated film is a mount film of the film J135, and nine frames when the kind of the discriminated film is a film IX-240.

Then, the images of frames of a number as many as possible can be efficiently displayed on the display screen.

When the film discriminated above is the mount film of the film J135, the determination means may so determine as to enhance the reading resolution of the reader means to be higher than that of the case of the piece film of the film J135.

In the case of the mount film of the film J135, therefore, the image that is read can be displayed maintaining a resolution higher than that of the case of the piece film of the film J135.

BRIEF DESCRIPTION OF THE DRAWINGS

FIGS. 7A–7D are diagrams illustrating the prescanning for the third carrier;

EMBODIMENTS

Embodiments of the present invention will now be described in detail with reference to the drawings.

Figure 2:
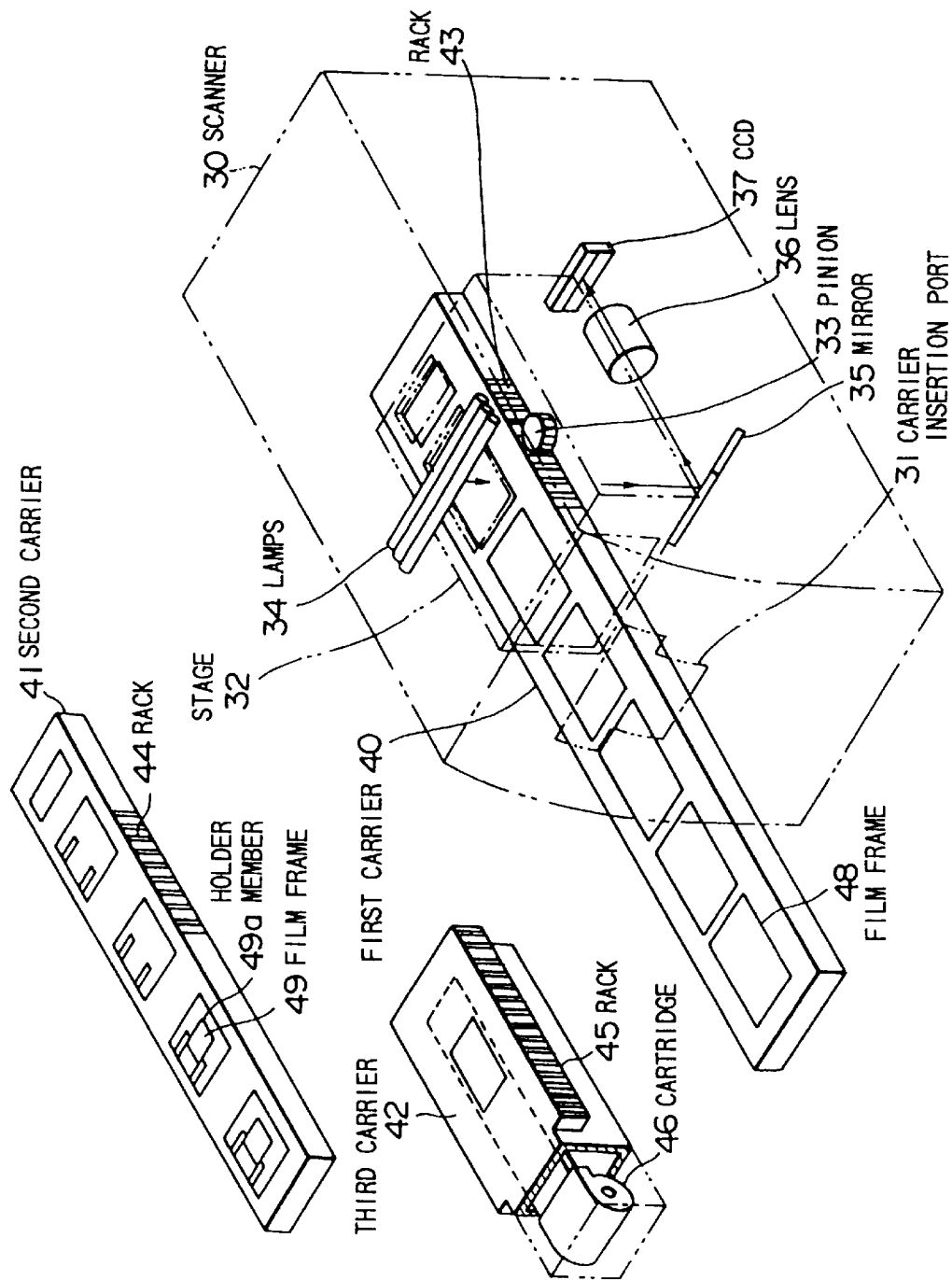
FIG. 2 is a perspective view illustrating the mechanical constitution according to the embodiment of the invention.
Figure 11:
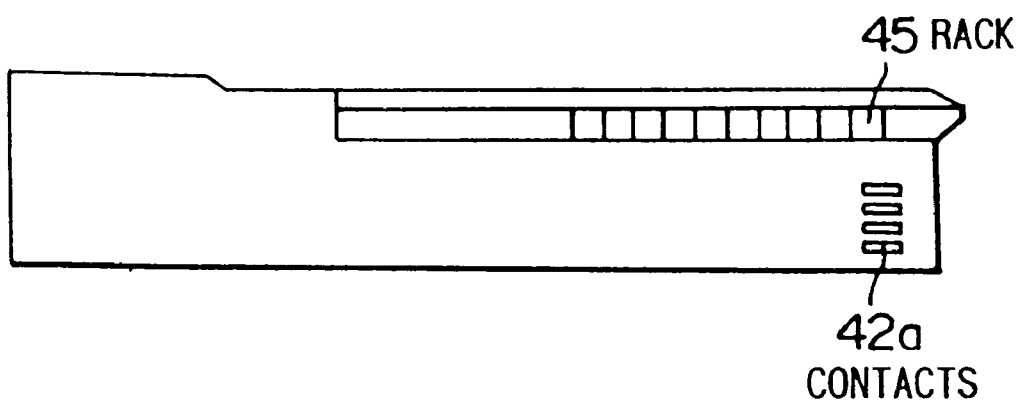
FIG. 11 is a diagram illustrating the appearance of the third carrier.

In FIG. 2, any one of a first carrier 40, a second carrier 41 or a third carrier 42 can be selectively inserted in a scanner 30. The first carrier 40 holds six frames of the piece film (negative film) J135, the second carrier 41 holds four frames of the mount film J135, and the third carrier 42 stores a long wound film IX-240 (film for a new photographic system). Unlike the first carrier 40 and the second carrier 41, the third carrier 42 has a cartridge structure as shown in the figure and is equipped with a mechanism for winding and rewinding the film. The third carrier 42 has, on the side surface thereof, contacts 42a for exchanging signals relative to a stage 32 as shown in FIG. 11. The contacts 42a serve as communication terminals RXD, TXD that will be described later.

The first carrier 40 is to mount a film of six consecutive frames. The second carrier 41 has the same vertical and lateral sizes as the first carrier but has a difference in regard to the number of frames and the method of mounting. Film frames 48 are mounted on the first carrier 40, and film frames 49 are mounted on the second carrier 41. The second carrier 41 has a holder member 49a for holding the film frames 49. The scanner 30 has a carrier insertion port 31 for inserting the above-mentioned carriers. The scanner 30 further includes a stage 32 which mounts and moves the carrier 40, 41 or 42. The carriers 40, 41 and 42 have racks 43, 44 and 45 formed on the side surfaces thereof. The scanner 30 is provided with a pinion 33, and a rack-and-pinion gear is constituted by these racks 43, 44, 45 and the pinion 33. The scanner 30 is equipped with a lamp 34 for illuminating film frames mounted on the first carrier 40, a mirror 35 for reflecting the image data from the lamp 34 passing through the film, a lens 36 for focusing the light reflected by the mirror 35, and a CCD 37 for converting the light focused by the lens 36 into electric signals. The lamp 34 is provided for each of R, G and B, and the CCD 37 is a monochromatic line CCD which receives color data corresponding to R, G or B produced by the lamps that are successively changed over. The processing is repeated in which every time when the frame is fed by one step by the stepping motor, color data is, first, read by irradiation with R, color data is, then, read by irradiation with G, and, then, color data is read by irradiation with B.

The third carrier 42 is loaded with a cartridge 46 which contains a film that has been developed, and the film is fed frame by frame by a drive mechanism.

Figure 1:
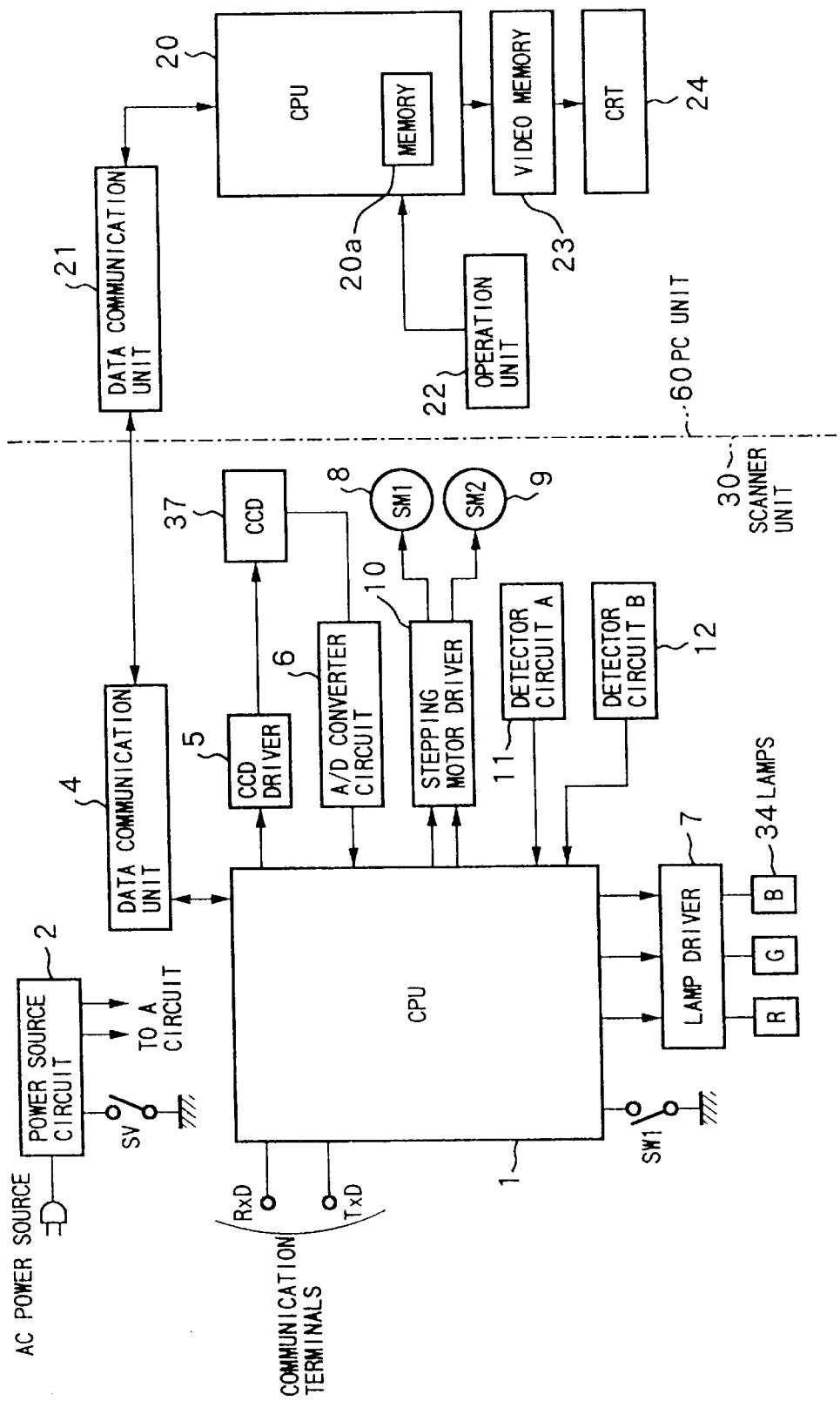
FIG. 1 is a block diagram illustrating the constitution of an electric circuit according to an embodiment of the present invention.

The device shown in FIG. 1 is constituted by a scanner unit 30 and a personal computer (hereinafter referred to as PC) unit 60. In the scanner unit 30, a CPU 1 controls the whole operation. Symbols RXD and TXD denote communication terminals for data communication with the third carrier 42, and are connected to the CPU 1. A power source circuit 2 for feeding the electric power to the circuit from the AC source is provided with a switch Sv for turning the power source circuit 2 on. A switch SW1 is a reset switch provided to reset the CPU 1.

A data communication unit 4 for exchanging data relative to the PC comprises, for example, an SCSI interface. A CCD driver 5 drives the CCD 37 which is a line CCD as shown in FIG. 2. The image signals read by the CCD 37 are converted through an A/D converter 6; i.e., image signals are converted into ditigal data.

A lamp driver 7 connected to the CPU 1 drives the lamps 34 provided for R, G and B. A first stepping motor (SM1) 8 drives the rack-and-pinion mechanism, and a second stepping motor 9 drives the stage 32. The first and second stepping motors 8 and 9 are driven by a stepping motor driver 10.

When any one of the first carrier 40, the second carrier 41 or the third carrier 42 is inserted in the scanner 30, a first detector circuit A11 and a second detector circuit B12 detect the position of the carrier to set the initial position of the carrier.

In the PC unit 60, a CPU 20 controls the whole operation, and a memory 20a is provided in the CPU 20 and stores the image data that are read out. The memory 20a stores in advance the number of frames to be displayed on the display means depending upon the kind of the film read in the prescanning and the resolution data for each frame. A data communication unit 21 is provided to exchange the data relative to the scanner unit 30. An operation unit 22 is for instructing various operations to the CPU 20 and includes, for example, a keyboard, a mouse, etc. A video memory 23 stores the image data read from the film, and a CRT 24 constitutes a display means for displaying at all times the image data stored in the video memory 23. Described below is the operation of the thus constituted device.

(1) Discriminating the kind of the film.

An operator inserts a film carrier through the carrier insertion port 31. The inserted film carrier is detected by the detector circuits A11 and B12, and the outputs of the detector circuits A11 and B12 are sent to the CPU 1. The CPU 1 drives the first stepping motor 8 to move the carrier, so that the carrier is brought to the initial position (reference position) which is detected by the detector circuits A11 and B12.

Figure 3A:
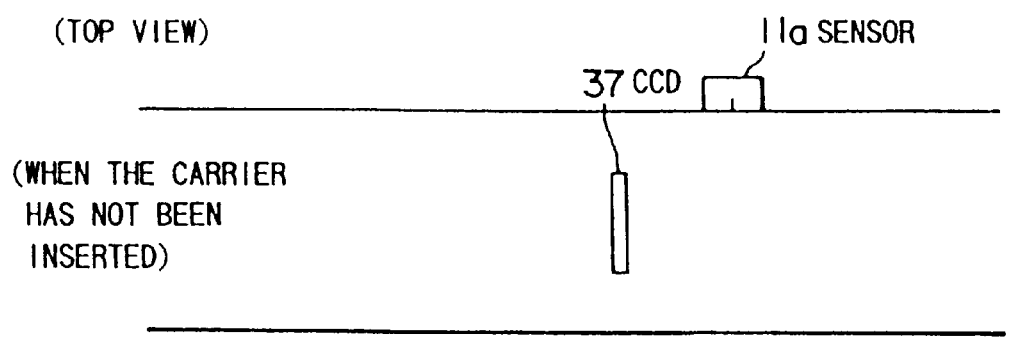
FIG. 3A through FIG. 3C are diagrams illustrating the operation for setting the initial position of a first carrier.
Figure 3B:
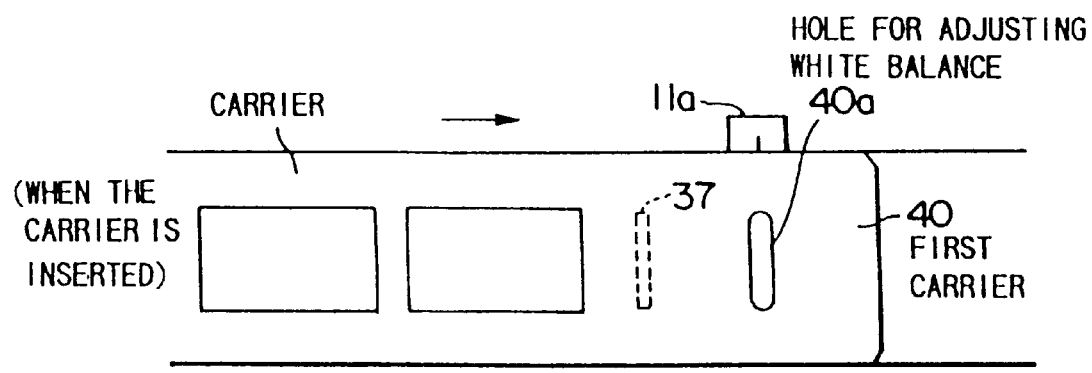
Figure 3C:
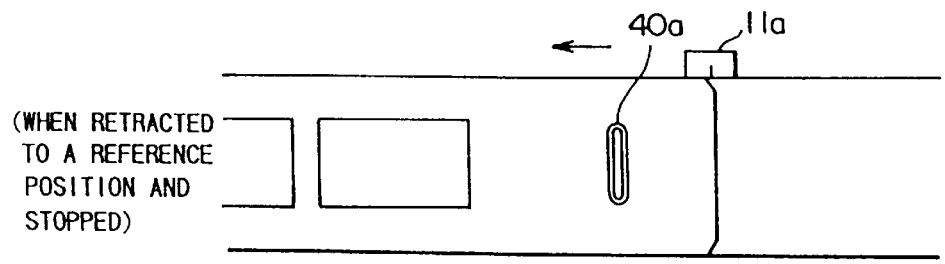

FIGS. 3A through 3C are diagrams illustrating the operation for setting the initial position of the first carrier 40, and is a top view of the scanner 30. FIG. 3A illustrates a state where the carrier has not been inserted, FIG. 3B illustrates a state where the carrier is inserted, and FIG. 3C illustrates a state where the carrier is set to a reference position. In FIG. 3A, a position sensor 11a for detecting the carrier constitutes a portion of the detector circuit A11, and is constituted by using, for example, a photoreflector (P/R). The CCD 37 is positioned under the carrier that is inserted.

In this state, the first carrier 40 is inserted as shown in FIG. 3B which illustrates a state where the first carrier 40 has been inserted at a proper position. Reference numeral 40a denotes a hole for adjusting white balance formed in the first carrier 40. In this state, the position sensor 11a detects that the first carrier 40 is inserted and informs the CPU 1 of this fact. The CPU 1 drives the stepping motor 8 so that the head position of the first carrier 40 is brought to a position (reference position) of the position sensor 11a due to the rack-and-pinion mechanism. In this state (see FIG. 3C), when the lamp 34 is illuminated from the upper side of the paper, the light falls on the CCD 37 passing through the hole 40 for adjusting white balance. Therefore, the CCD 37 detects light. Thus, the CPU 1 confirms that the first carrier 40 is inserted.

The detection of the insertion of the third carrier 42 is carried out in the same manner as that of the case of the first carrier 40.

Figure 4A:
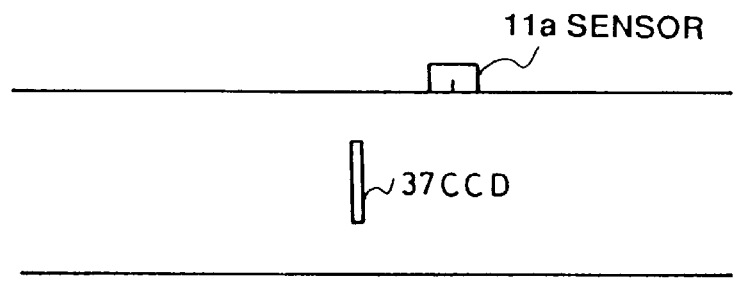
FIG. 4A through FIG. 4C are diagrams illustrating the operation for setting the initial position of a third carrier.
Figure 4B:
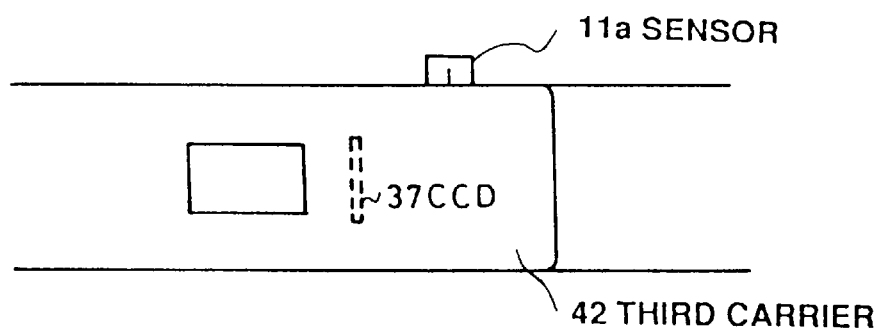
Figure 4C:
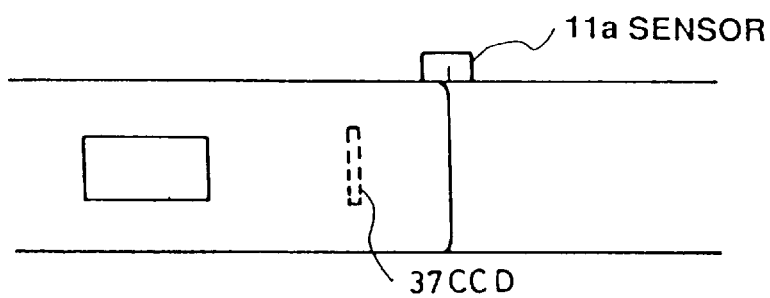

FIGS. 4A through 4C are diagrams illustrating the operation for setting the initial position of the third carrier 42, and is a top view of the scanner 30, wherein FIG. 4A illustrates a state where the carrier has not been inserted, FIG. 4B illustrates a state where the carrier is inserted, and FIG. 4C illustrates a state where the carrier is set at the reference position.

In this state, the third carrier 42 is inserted. FIG. 4B illustrates a state where the third carrier 42 is inserted at a proper position. In this state, the position sensor 11a detects that the third carrier 42 is inserted, and informs the CPU 1 of this fact. The CPU 1 drives the stepping motor 8, so that the head position of the third carrier 42 is brought to the position (reference position) of the position sensor 11a due to the rack-and-pinion mechanism. Even when the lamp 34 is turned on from the upper side of the paper in this state (see FIG. 4C), the CCD 37 does not detect light since the hole for adjusting white balance has not been formed in the third carrier 42. Accordingly, the CPU 1 confirms that the third carrier 42 is inserted.

Next, described below is a method of automatically discriminating the first carrier 40 over the second carrier 41.

Figure 3D:
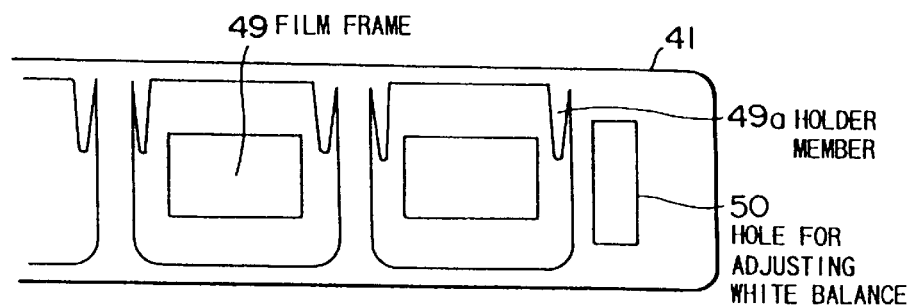
FIG. 3D is a diagram illustrating the operation for setting the initial position of a second carrier.

FIG. 3D shows the appearance of the second carrier 41. The second carrier 41 is for a positive film. Four pieces of positive films can be secured to the carrier by the holder member 49a. The operation for setting the initial position of the second carrier 41 is the same as the operation for setting the initial position of the first carrier 40 shown in FIG. 3A.

Therefore, the size of the hole 50 for adjusting white balance of the second carrier 41 is selected to be different from that of the hole 40a for adjusting white balance of the first carrier 40 (here, the hole 50 for adjusting white balance of the second carrier 41 is formed to be larger than the hole 40a for adjusting white balance of the first carrier 40). Then, the first carrier 40 and the second carrier 41 can be automatically discriminated from each other by a provision of the sensor 12 (see FIG. 1) such as a photo-detector which detects light that passes through the hole 50 for adjusting white balance of the second carrier 41 but does not detect light that passes through the hole 40a for adjusting white balance of the first carrier 40. Concretely speaking, the CPU 1 renders the discrimination depending upon the output of the sensor 12.

Thus, the data related to the kind of the film confirmed by the CPU 1 are input to the data communication unit 21 in the PC unit through the data communication unit 4, and is sent to the CPU 20 from the data communication unit 21. According to the embodiment of the present invention as described above, the kind of the film may be discriminated relying upon the carrier that holds the film.

Figure 5:
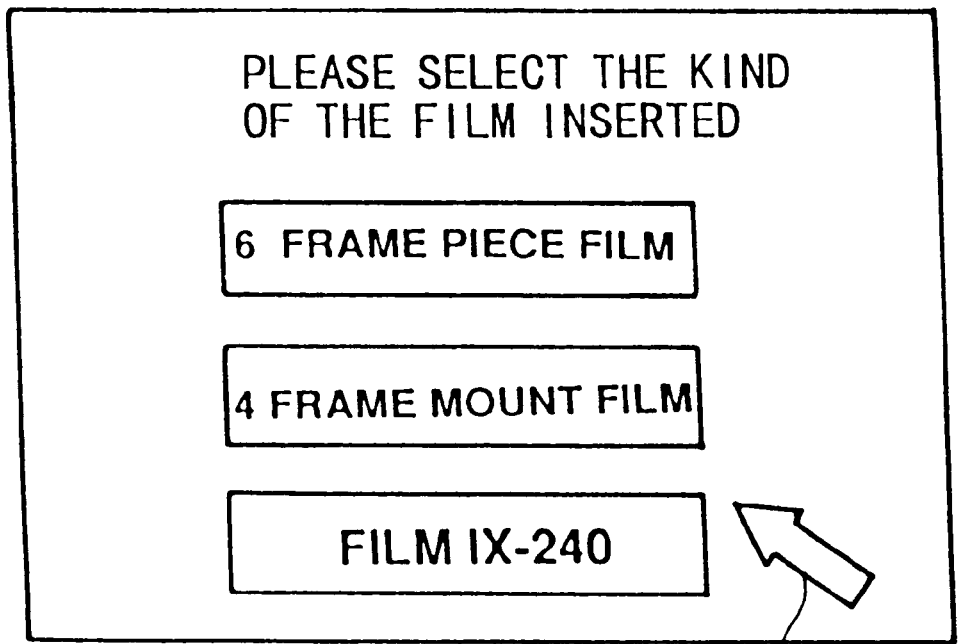
FIG. 5 is a diagram illustrating the display of messages on a display screen.

Relying upon the above-mentioned operation, the CPU 20 automatically discriminates the kind of the film (piece film of the film J135, mount film of the film J135, long wound film IX-240) loaded into the scanner 30. However, the operator is allowed to input the kind of the film by hand. In this case, the CPU 20 displays messages as shown in FIG. 5 on the CRT 24.

Depending upon the messages, the operator selects the piece film (negative film) J135 of six frames, the mount film (reversal film) J135 of four frames or the film IX-240 of nine frames. Concretely speaking, the cursor K is brought into a portion surrounded by a frame, and the mouse attached to the operation unit is clicked to select the film. When the operator clicks, for example, the frame of the six-frame piece film, the CPU 20 confirms that the film that is inserted is a negative film.

According to the present invention as described above, it is allowed to employ both the method of automatically discriminating the kind of the film and the method of inputting the kind of the film by hand. When the kind of the film automatically discriminated is different from the kind of the film input by hand, the CPU 20 may display alarm on the CRT 24 upon receiving the film confirmation data from the CPU 1.

(2) Prescanning.

Figure 6A:
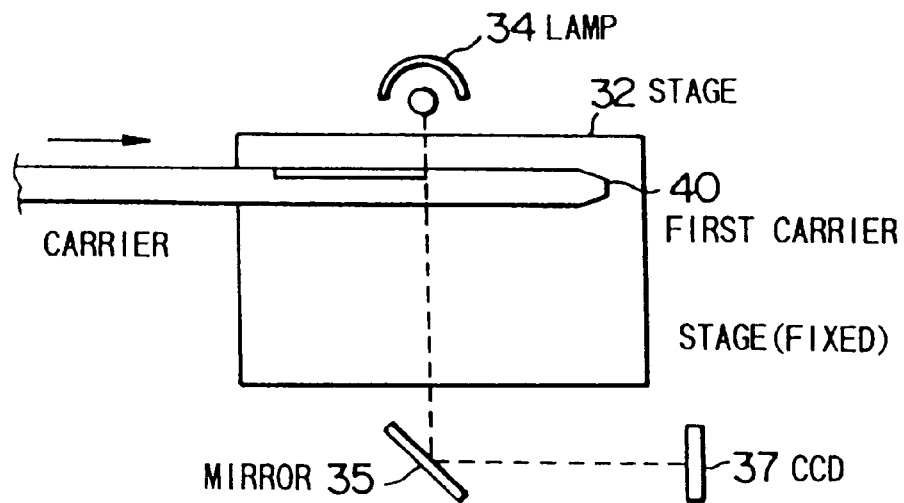
FIG. 6A and FIG. 6B are diagrams illustrating the prescanning for the first carrier.
Figure 6B:
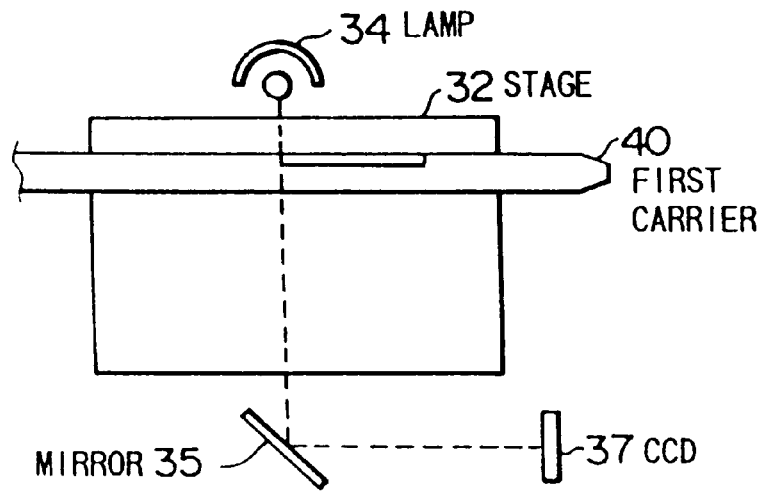

First, described below is the prescanning for the first carrier 40. FIGS. 6A and 6B are diagramd illustrating the prescanning for the first carrier 40, wherein FIG. 6A shows a state of the initial position and FIG. 6B shows a state where one frame is scanned by driving the carrier and the reading of the first frame is finished.

When the first carrier 40 is to be prescanned by the first stepping motor 8, the carrier is scanned in a direction (left→right) in the drawing by using the rack-and-pinion. When the film is illuminated by the lamp 34 at this moment, the transmission light is reflected by the mirror 35 and forms image on the CCD 37. The image signals converted through the photoelectric conversion by the CCD 37 are further converted, through the A/D converter 6, into digital image data, sent from the CPU 1 to the PC side through the data communication unit 4, and are stored in the memory 20a in the CPU 20. In the prescanning, the image data are coarsely read out. That is, the image signals for each of the dots photoelectrically converted by the CCD 37 are read in a skipped manner maintaining a predetermined distance. Thus, the frames are successively moved in the direction indicated in the figure by the rack-and-pinion, whereby the image data of six frames are read and are stored in the memory 20a.

Next, described below is the prescanning for the third carrier 42.

Figure 7D:
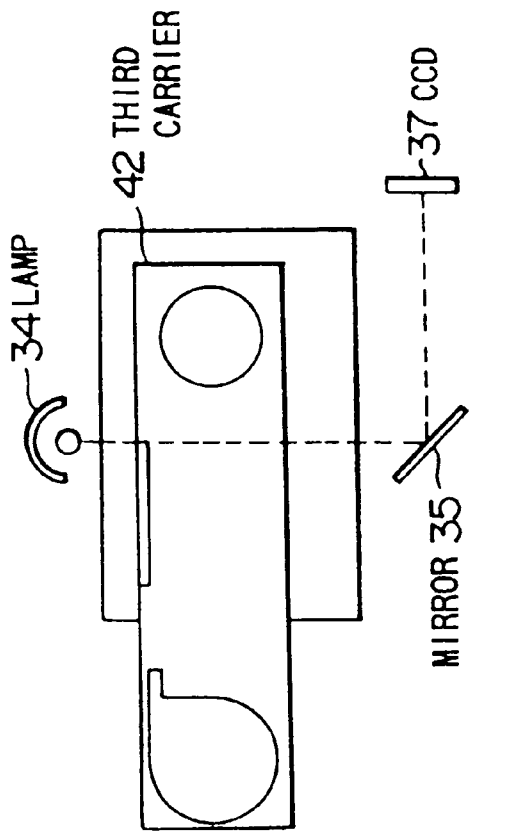
Figure 7C:
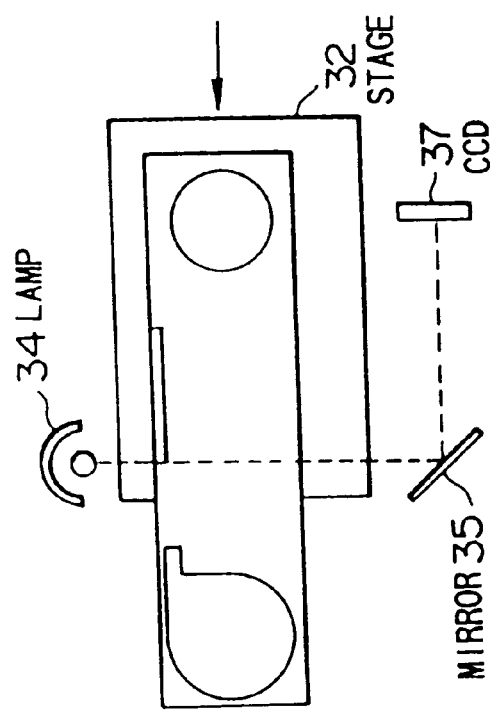

FIGS. 7A through 7D are diagrams illustrating the prescanning for the third carrier 42, wherein FIG. 7A illustrates a state of the initial position, FIG. 7B illustrates a state of when the reading of the first frame is finished, FIG. 7C illustrates a case where the stage 32 is read by being moved in the reverse direction by one frame, and FIG. 7D illustrates a state where the reading of image data in the reverse direction is finished. In the case of the third carrier 42, the image data recorded on the frame are read by the CCD 37 as the stage 32 moves at a high speed in the direction of arrow (left→right) in the drawing. The image signals of the frame that are read are converted into digital image data through the A/D converter circuit 6, sent to the PC unit through the data communication unit 4, and are stored in the memory 20a in the CPU 20. After the reading of image of one frame is finished, the film is wound by one frame in the third carrier 42, the stage 32 is moved in the reverse direction, and the next frame is scanned in the reverse direction to read the image data.

Figure 8:
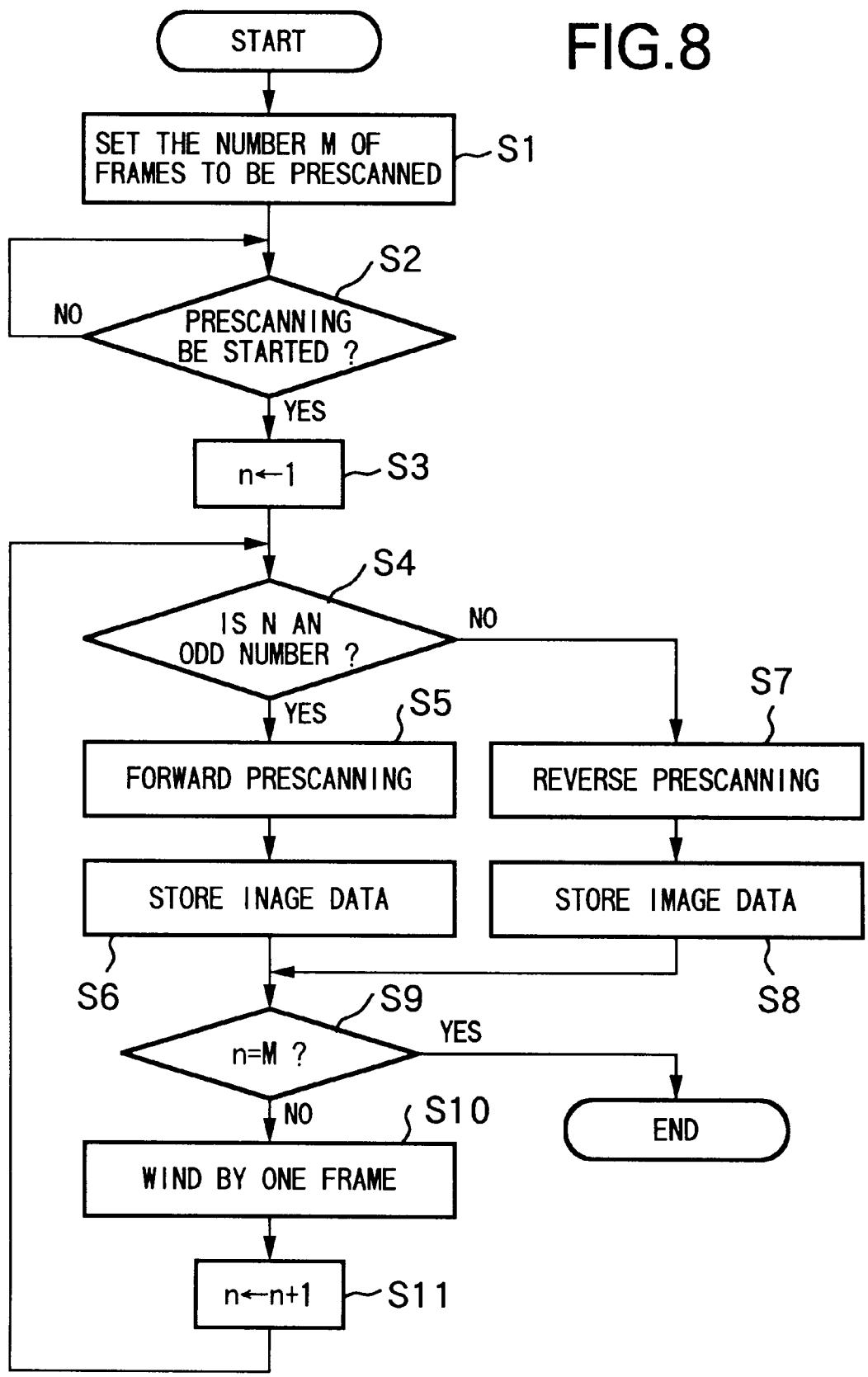
FIG. 8 is a flow chart illustrating the prescanning operation for the third carrier.

FIG. 8 is a flow chart illustrating the prescanning operation for the third carrier 42. The film for the new photographic system has a maximum of 40 frames and, hence, the operator necessarily inputs the number M of frames to be prescanned through the operation unit 22 (S1). Next, it is checked whether the prescanning be effected or not. When the start of scanning is instructed from the operation unit 22, the prescanning mode is assumed (S2).

In this case, first, a constant N is set to an initial value 1 (S3). Next, it is checked if N is an odd number or not (S4). In the case of a new photographic film, the forward scanning and the reverse scanning are repeated successively, and a predetermined number of frames are read maintaining a coarse resolution. When the number of the frames is an odd number, the CPU 1 drives the stepping motor 9 to move the stage 32 holding the third carrier 42 in the forward direction (left→right in FIG. 7), so that the image data of the frame are read by the CCD 37 (S5). The stage 32 moves at this moment. The image data that are read are sent to the PC unit through the data communication unit 4, and are stored in the memory 20a in the CPU 20 (S6). Next, the carrier 42 winds the film by one frame.

When there are an even number of the frames in the step S4, the CPU 1, then, moves the stage 32 in the reverse direction (right→left), and the image data of the frame are read by the CCD 37 (S7). The image data that are read are sent to the PC unit through the data communication unit 4 and are stored in the memory 20a in the CPU 20 (S8). After the reading of image data of one frame is finished, the CPU 1 checks whether n=M (S9). At a moment when n=M is reached, it means that the reading of all designated frames is finished, and the prescanning ends. When n is not equal to M, the reading of all frames has not yet been finished, and the CPU 1 drives the stage 32 to wind the film by one frame (S10). Next, n is updated by 1 (S11), and the program returns back to the step S4 to start reading the next frame.

(3) Displaying the Frame Images on the CRT.

Figure 9A:
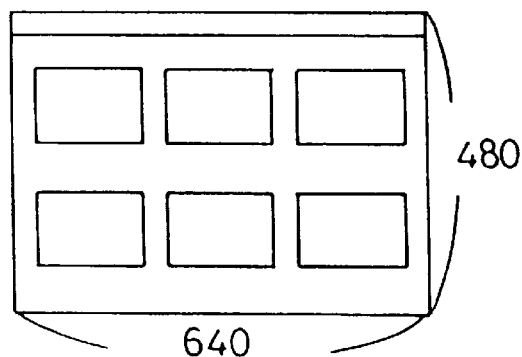
FIGS. 9A–9C are diagrams illustrating the states of displaying images on a CRT.
Figure 9B:
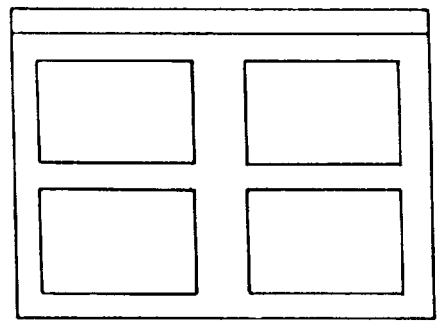
Figure 9C:
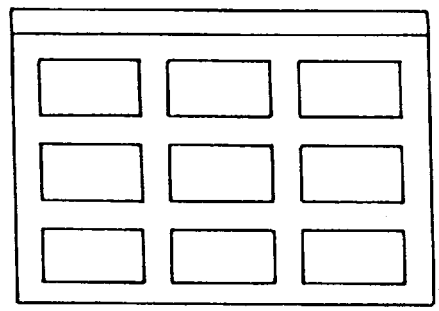

After the image data of the frame are stored in the memory 20a, the CPU 20 index-displays the frame images that are read on the CRT 24. FIGS. 9A through 9C are diagrams illustrating the states of displaying images on the CRT, wherein FIG. 9A is the case of a piece film J135 (negative film), FIG. 9B is the case of a mount film J135 (reversal film), and FIG. 9C is the case of a film IX-240. The CPU 20 stores the number of the index-displayed frames depending upon the kind of the film read by the scanner and the resolution of the frame image as a result of the operation mentioned earlier. Therefore, the CPU 20 index-displays the frames as shown in the figure depending upon the kind of the film that is read.

So far, the frames have been displayed by the operator on the display unit frame by frame. Displaying desired frames on the display unit out of a plurality of frames requires a skill particularly when the developed film is a negative film. The meaning of displaying a plurality of frames on the display unit is as described below. In the case of a negative film, for example, the film must be turned into positive images as early as possible to let the operator know the frames that are desired to be scanned. Since the screen needs be small, the frames are index-displayed to let the operator know the images that have been photographed. Even in the case of the reversal film, the operator must know the images that have been photographed.

In the case of the positive image, it is allowed to confirm the images that have been recorded in the step of the film. It may therefore be requested to watch the images on a large scale and in detail. The resolution of the display unit remains the same and, hence, must be enhanced to take a good look of the reversal image. In the case of the long wound film IX-240, the negative film has been wound in the cartridge, and no image can be seen in this state. It therefore becomes necessary to let the operator see the recorded images as early as possible. However, displaying the whole 40 frames of the film IX-240 is not practicable since each frame becomes too small.

The negative film has a vertical to lateral ratio of 2 to 3, and the film IX-240 has a vertical to lateral ratio of 9 to 16. When compared in terms of the image size (mm), the negative film has a vertical to lateral ratio of 24 to 36, and the film IX-240 has a vertical to lateral ratio of 16.7 to 30. The CRT for displaying the frame images has a vertical to lateral ratio of 3 to 4. The above-mentioned numbers of frames of the films on one screen were determined as a point of compromise in that it is desired to display as many frame images having different vertical to lateral ratios as possible on the CRT in one time of operation maintaining a necessary and sufficient resolution.

It is thus desired to arrange the frame images having different vertical to lateral ratios and different image sizes on the CRT of a predetermined screen size having a different vertical to lateral ratio maintaining resolution as high as possible and efficiently. In the case of the negative film, therefore, the number of frames to be displayed on one screen becomes six. In the case of the reversal film which must be displayed maintaining a higher resolution, the number of frames to be displayed on one screen becomes four and in the case of the film IX-240, the number of frames to be displayed on one screen becomes nine. According to the present invention, as described above, it becomes possible to efficiently display the images of frames of a number as many as possible on the display screen.

The CRT 14 usually has a resolution of 480 dots in the vertical direction and 640 dots in the lateral direction. In the case of the negative film shown in FIG. 9A, therefore, the number of vertical×lateral dots required for each frame (resolution is, for example, about 150×220 dots by taking into consideration of the display areas other than the images and gaps that accompany the layout) is determined to display six frame images mounted on the carrier on one screen, and the image data are sent to the video memory 23. The reading resolution in this case is about 160 dpi. Thus, the images of six frames are index-displayed on the CRT 24 as shown in FIG. 9A.

In the case of the reversal film, the number of frames mounted on the carrier is four. Therefore, the CPU 20 determines the required number of vertical×lateral dots (resolution is, for example, about 180×270 dots by taking into consideration of the display areas other than the images and gaps that accompany the layout), and the image data are sent to the video memory 23. The reading resolution in this case is about 190 dpi. Thus, the images of four frames are index-displayed on the CRT 24 as shown in FIG. 9B. In this case, each frame has an increased number of image data and, hence, the frame image is displayed maintaining resolution higher than that of the frame image data shown in FIG. 9A. Thus, the CPU 20 index-displays photographs of a frame number as many as possible on the display screen maintaining the resolution read by the CCD depending upon the kind of the film. According to the present invention as described above, the mount film of the J135 film enables the images to be displayed maintaining a resolution higher than that of the case of the piece film J135.

On the other hand, the film IX-240 shown in FIG. 9C has a maximum of 40 frames. Therefore, all of the frames cannot be displayed by one time of display operation. Therefore, the CPU 20 manages the number of frames by pages. The relationship between the pages and the frames is as follows:

Page 1 1 to 9

Page 2 10 to 18

Page 3 19 to 27

Page 4 28 to 36

Page 5 37 to 40

Thus, the CPU 20 displays message data for selecting a desired page on the CRT 24. When the operator inputs a desired page from the operation unit 22, the index images of the desired page are displayed on the CRT 24. Instead of effecting the above-mentioned operation, the scroll operation may be effected to successively display the index images starting from page 1. In this case, the resolution of the frame is about 110×200 dots by taking into consideration of the display areas other than the images and gaps accompanying the layout, and the reading resolution is about 170 dpi.

According to the present invention as described above, the frame images can be displayed on the display means maintaining a resolution higher than a predetermined value depending upon the kind of the film. Irrespective of the kind of the film, furthermore, the image data are read out, and the frames of a predetermined number are displayed on the display means maintaining a precision read by the CCD depending upon the kind of the film, and the images are displayed maintaining a resolution read by the CCD depending upon the kind of the film.

According to the present invention, the frame images of the films are displayed on the CRT maintaining a resolution as high as possible and in a number as many as possible.

Finally, described below in detail is the third carrier 42 for the new photographic system. As shown in FIG. 2, the film IX-240 that has been developed is mounted being wound in the cartridge 46. The third carrier 42 is provided thereon with a mechanism for winding the film.

Figure 10:
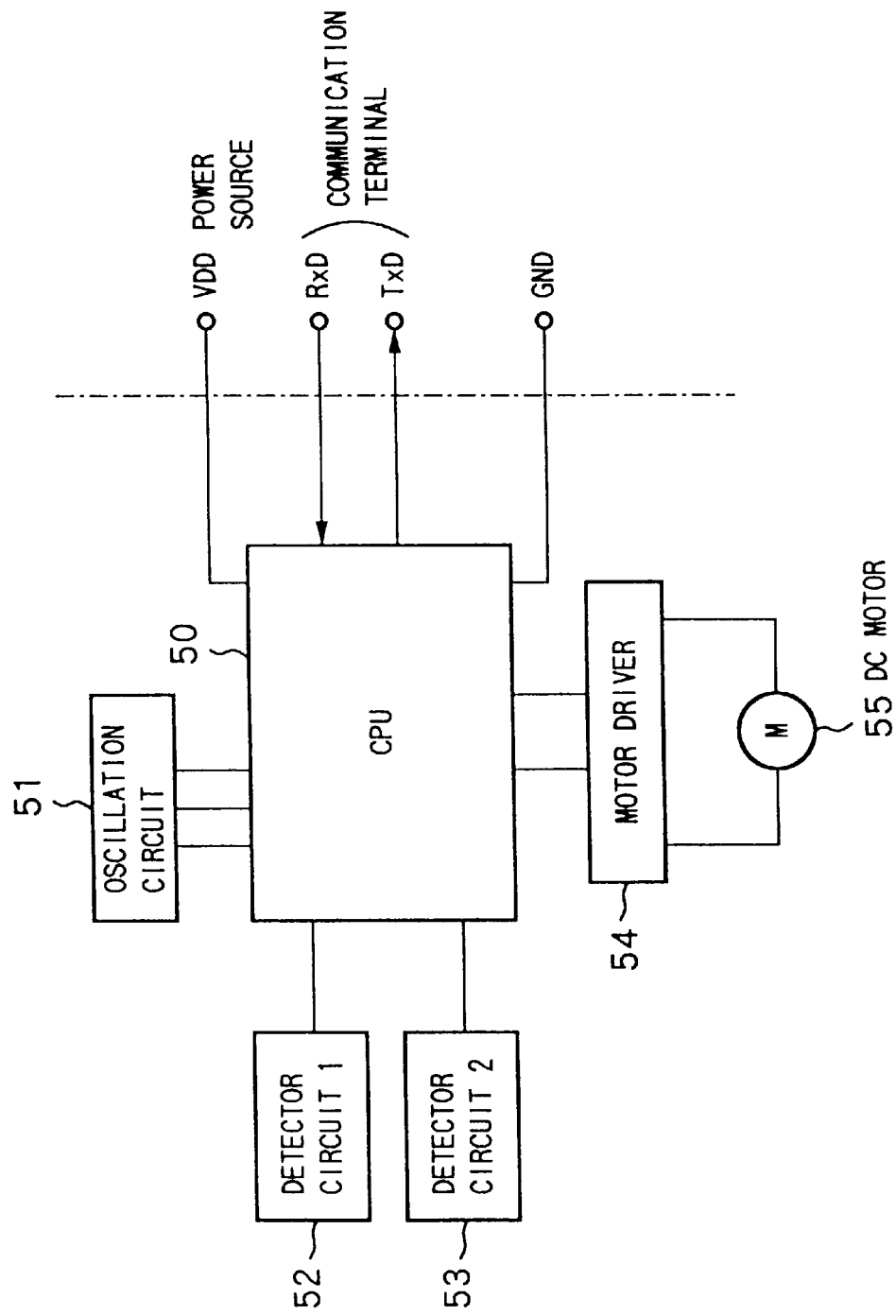
FIG. 10 is a block diagram illustrating the electrical constitution of the third carrier.

FIG. 10 is a block diagram illustrating the electrical constitution of the third carrier 42. This unit is inserted in the scanner 30 and is supplied with electric power from the scanner 30. In FIG. 10, there are terminals VDD and GND. In FIG. 10, reference numeral 50 denotes a CPU for controlling the whole operation, 51 denotes an oscillation circuit for giving operation clocks to the CPU 50, reference numeral 52 denotes a first detector circuit for detecting perforations of the film when it is fed frame by frame, 53 denotes a second detector circuit for detecting a position at which the film ends, 54 denotes a motor driver that receives control signals from the CPU 50, and reference numeral 55 denotes a DC motor which is driven by the motor driver 54 and serves as a source of drive for winding or unwinding the film. Symbols RXD and TXD denote communication terminals that are connected to the CPU 1 (see FIG. 1) in the scanner 30 to exchange the data. Described below is the operation of the thus constituted device.

First, when the carrier 42 mounting the cartridge 46 is loaded into the scanner 30, the state shown in FIG. 4C is assumed due to the operation for setting the initial position, whereby the carrier 42 is connected to the scanner 30 via contacts and is supplied with the electric power. Then, the CPU 50 sends control signals to the motor driver 54 to turn the DC motor 55. Then, the film is delivered from the cartridge 46 toward the other end. A winding spool is turned by the DC motor 55 to wind the film. When it is detected by the first detector circuit 52 that the first frame has arrived at the predetermined initial position, the CPU 50 ends the operation for setting the initial position. Then, the prescanning operation is effected in which the data such as a given number of frames and the like are received from the CPU 1 of the scanner side via the communication terminals. The first detector circuit 52 detects the perforation of the film, and the CPU 50 controls the operation for feeding the frame from the frame position to a next frame position by using the output of the detector circuit 52. The subsequent operation is as shown in FIG. 8.

The above-mentioned embodiment has dealt with a case where the device of the invention is realized by combining the scanner unit and the PC unit together. The invention, however, is in no way limited thereto only. For instance, the device of the invention can be realized based on the scanner unit alone by connecting the operation unit, video memory and CRT together.

What is claimed is:

1. A scanner comprising:

an image reader means for reading image data of an image recorded on a film;

a discrimination means for discriminating a kind of the film;

a determination means for determining how many frames are displayed on a screen of the display means, depending upon the kind of the film that is discriminated by the discrimination means; and a processor for generating a signal for displaying the image based on the determination made by the determination means.

2. The scanner of claim 1, wherein said discrimination means discriminates the kind of the film based on a carrier for holding the film, which differs depending upon the kind of the film.

3. The scanner of claim 1, wherein said determination means determines the number of the frames to be displayed on a display to be six when the kind of the discriminated film is a piece film of the film J135, four when the kind of the discriminated film is a mount film of the film J135, and nine when the kind of the discriminated film is a film IX-240.

4. The scanner of claim 1, wherein when the kind of film discriminated by the discrimination means is a mount film of the film J135, said determination means changes a reading resolution of the reader means to become higher than a reading resolution of a piece film of the film J135.

5. A scanner comprising:

an image reader for generating image data by reading an image recorded on a film;

a discrimination means for discriminating a kind of the film;

a determination means for determining at least either one of how many frames are displayed on a screen of the display means and a reading resolution of the image reader means, depending upon the kind of the film that is discriminated by the discrimination means; and a processor for generating a signal for displaying the image based on the determination made by the determination means, wherein when the kind of film discriminated by the discrimination means is a mount film of the film J135, the determination means changes a reading resolution of the reader means to become higher than a reading resolution of a piece film of the film J135.

6. The scanner of claim 5, wherein said discrimination means discriminates the kind of the film based on a carrier for holding the film, which differs depending upon the kind of the film.

* * * * *